United States Patent [19]

Bishop

[11] Patent Number: 4,550,820

[45] Date of Patent: Nov. 5, 1985

[54] APPARATUS FOR ORIENTING AND STACKING HOLLOW, FRUSTO-CONICAL CONTAINERS

[76] Inventor: Robert R. Bishop, 93 Palmdale Dr., Agincourt, Ontario, Canada, M1T 1P2

[21] Appl. No.: 529,292

[22] Filed: Sep. 6, 1983

[51] Int. Cl.$^4$ .......................... B65B 25/00; B65G 57/00
[52] U.S. Cl. ..................................... 198/389; 198/399; 198/455; 414/105
[58] Field of Search ............... 198/389, 462, 382, 399, 198/455; 414/105

[56] References Cited

U.S. PATENT DOCUMENTS

| | | | |
|---|---|---|---|
| 3,120,888 | 2/1964 | Piel | 198/389 X |
| 3,764,025 | 10/1973 | Van Melle et al. | 414/105 |
| 4,066,174 | 1/1978 | Collins et al. | 414/105 X |
| 4,498,273 | 2/1985 | Calamussi | 198/389 X |

Primary Examiner—Robert J. Spar
Assistant Examiner—Janice Krizek

[57] ABSTRACT

Apparatus for orienting and stacking hollow, frusto-conical containers or other articles has a downwardly inclined ramp for receiving the articles in random orientations. A deflector wall spaced by a gap from the bottom end of the ramp serves to deflect the articles to the gap, which is greater than the width of the widest end of the articles and less than the length of the articles, so that the articles can drop into the gap only with the widest end uppermost. Endless conveyor belts are provided below the gap for receiving the articles therebetween and conveying the articles. The ramp is formed by the upperwardly driven upper run of an endless belt arrangement, or has an upwardly rotating roller at the bottom thereof, for displacing upwardly of the ramp an adjacent portion of any of the articles which bridges the gap so that the containers are caused to fall properly into the gap.

14 Claims, 6 Drawing Figures

APPARATUS FOR ORIENTING AND STACKING HOLLOW, FRUSTO-CONICAL CONTAINERS

FIELD OF THE INVENTION

The present invention pertains to apparatus for orienting articles, for example hollow, frusto-conical containers, delivered in random orientations to the apparatus, and is useful, in particular, in machines for orienting and stacking cups or the like of plastics material.

BACKGROUND OF THE INVENTION

The prior art includes a machine which is designed to orient and stack frusto-conical plastic cups as they are discharged from an injection molding machine. For this purpose, the prior art apparatus has an inclined vibrating ramp in the form of a trough for receiving the cups in random orientations as they are discharged from the injection molding machine. The ramp serves to cause the cups to become axially aligned, in mouth-to-mouth or mouth-to-base or base to base relationship.

From the ramp, the cups are delivered to a conveyor which comprises a pair of endless belts or circular cross-section spaced apart by a distance that is less than the largest diameter of the cups and greater than the smallest diameter of the cups. On this conveyor, the cups are suspended and advanced with their open ends uppermost.

This prior art apparatus has been found to operate satisfactorily at relatively low speeds, i.e. at relatively low throughputs.

However, when it is desired to increase the throughput of this prior art machine by increasing the inclination of the inclined vibrating ramp, it is found that the apparatus does not operate satisfactorily, because the cups can no longer be correctly oriented in axial alignment by the inclined vibrating trough.

OBJECTS OF THE INVENTION

It is accordingly an object of the present invention to provide a novel and improved apparatus for orienting hollow frusto-conical articles to facilitate the stacking of such articles in nested relationship.

BRIEF SUMMARY OF THE INVENTION

According to the present invention, apparatus for orienting frusto-conical articles comprises downwardly inclined ramp means for receiving the articles in random orientations, means spaced by a gap from a bottom end of the downwardly inclined ramp means for abutment with the articles, the gap being greater than the width of the narrowest end of the articles and less than the width of the widest end of the articles, conveying means beneath the gap for receiving and conveying the articles, the conveyor means comprising a pair of conveyor belts extending parallel to the gap and spaced apart by a distance which is greater than the width of the narrowest end of articles and less than the length of the articles and means for driving the conveyor belts, the downwardly inclined ramp means having means for displacing upwardly of the ramp means an adjacent portion of any of the articles which bridges the gap, whereby the articles are caused to fall between the conveyor belts with the widest ends thereof uppermost.

In one embodiment the ramp means may be formed by one or more endless belts having an upper run thereof defining the ramp surface and driven so that the upper run travels upwardly of the ramp means. Alternatively, there may be provided a simple ramp surface with a roller located at the bottom of the ramp surface, adjacent the gap, and disposed and located such that an upper portion of the periphery of the roller rotates upwardly of the ramp means.

The abutment means, in a preferred embodiment of the invention, is provided in the form of a vertical wall extending above and below the gap for deflecting the articles into the gap.

A preferred embodiment of the invention is illustrated in the accompanying drawings, in which:

FIG. 3 shows a broken-away view taken in cross-section along the line III—III of FIG. 1a;

Figure 1A:
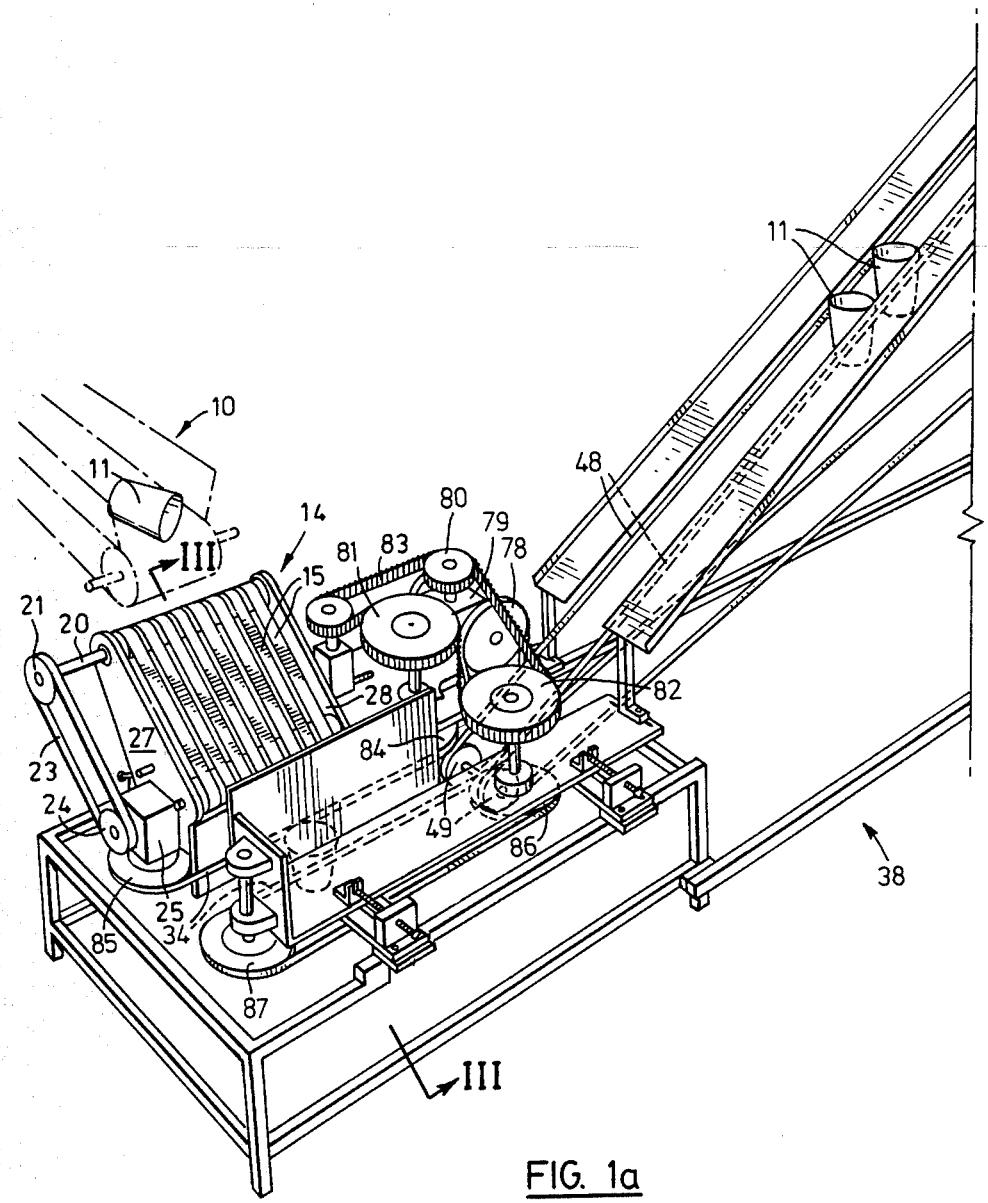
FIGS. 1a and 1b show views in perspective of apparatus for orienting and stacking frusto-conical plastics cups.

Referring firstly to FIG. 1a, there is shown in broken lines a conveyor indicated generally by reference numeral 10, for delivering plastic cups 11 from an injecting molding machine (not illustrated).

The conveyor 10 discharges the cups 11 onto a ramp indicated generally by reference numeral 14.

Figure 3:
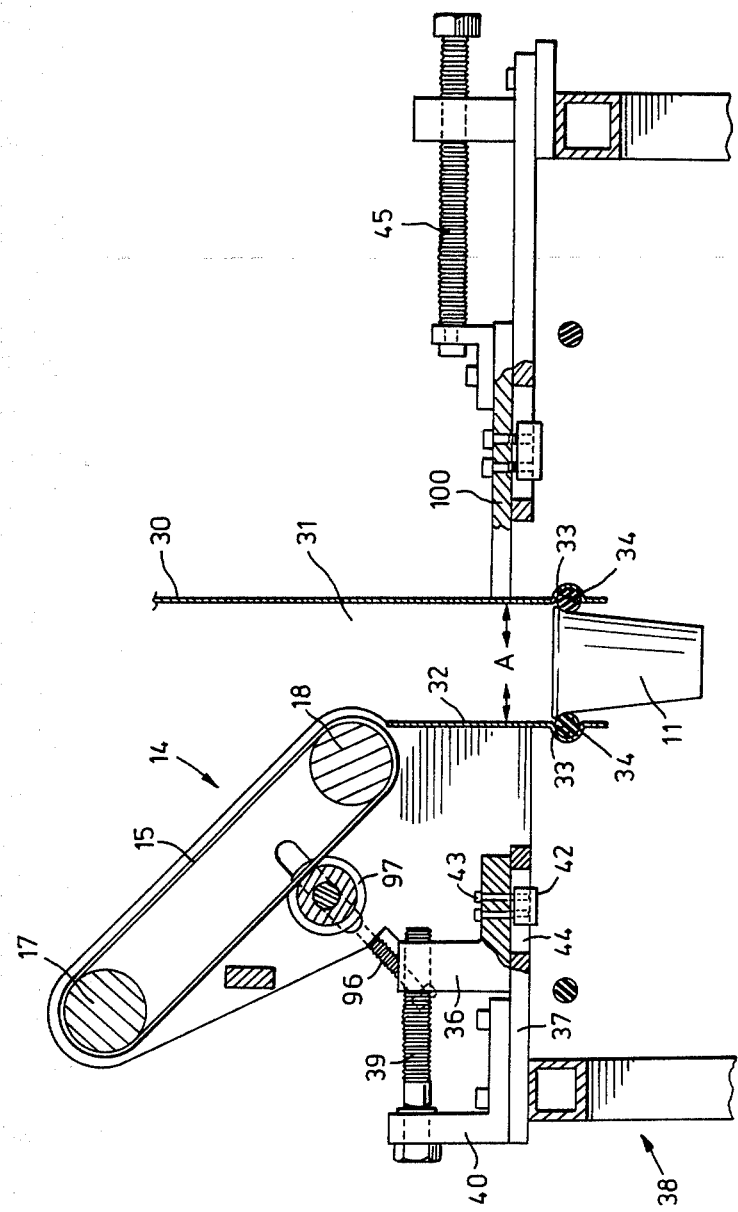

The ramp 14 is formed by the downwardly inclined upper runs of a plurality of endless belts 15 which, as shown in FIG. 3, extend around upper and lower rollers 17 and 18, respectively.

The upper roller 17 is connected through a shaft 20 to an upper pulley 21 which, in turn, is connected through an endless belt 23 to a lower pulley 24. The lower pulley 24 is driven, through a speed reduction gearing 25, as described in greater detail below, for driving the endless belts 15 and, more particularly, for driving the endless belts 15 in such a manner that the upper runs of the endless belts 15 travel upwardly, as indicated by arrows, of the downwardly inclined ramp 14.

The rollers 17 and 18 extend between and are journaled in a pair of side plates 27 and 28.

Referring again to FIG. 3, it will be seen that a vertical abutment or deflector plate 30 extends above and below the bottom end of the downwardly inclined ramp 14 and is spaced therefrom by a gap 31.

At the side of the gap 31 opposite from the plate 30, a further vertical plate 32 is provided, which extends downwardly from the bottom end of the ramp 14 and is spaced from the vertical plate 30 by a distance A.

The plates 30 and 32 are formed with opposed elongate concave recesses 33 of semi-circular cross-section for receiving and guiding adjacent runs 34 of a pair of horizontal, endless belts, which are of circular cross-section.

The gap 31 and the spacing A are wider than the greatest diameter of the cups 11 but less than the length, i.e. the height, of the cups 11.

However, the spacing between the adjacent runs 34 of the endless belts, while greater than the smallest diameter of the cups 11, is less than the greatest diameter of the cups 11 so as to be able to support the cups therebetween with the greatest diameters, and thus the mouths, of the cups upwardly. More particularly as shown in FIG. 3, the conveyor belt runs 33 are spaced apart by a distance which is just slightly less than the diameter of the cups 11 at the mouths of the cups, so that the cups 11 can be suspended from close to the tops thereof between the endless belts 34.

The side plates 27 and 28, and thus the rolls 17 and 18 and the endless belts 15, and also the vertical plate 32, which is fixed to the side plates 27 and 28, are supported on a slide bracket 36 which, in turn, is slidably supported on a slide plate 37 fixed to a machine frame indicated generally by reference numeral 38.

An adjustment bolt 39, which is freely rotatable in a support bracket 40 fixed to the slide plate 37, is in threaded engagement with the slide bracket 37, so that rotation of the bolt 39 will displace the slide bracket 36 towards or away from the gap 31, thus adjustably varying the size of the gap 31. A guide block 42, secured to the slide bracket 36 by bolts 43, is slidable in a slot 44 in the slide plate 37 for guiding the slide bracket 36 during such movement.

The vertical plate 30 is likewise adjustably movable towards and away from the gap 31 by means of an adjustment bolt 45 for adjustably varying the size of the gap 31 and the spacing A.

The endless belts 34 are supported for corresponding displacement by means of the adjustment bolts 39 and 45, as described in greater detail hereinafter.

Thus, the gap 31, the spacing A and the distance between the endless belt runs 33 can be adjusted to adapt the machine to cups of different diameters.

Referring again to FIG. 1a, a pair of upwardly inclined endless conveyor belts 48 are provided for receiving and advancing the cups 11 as they reach the discharge end of the conveyor constituted by the endless belts 34.

The belts 48 extend around pulleys 49 below the endless belts 34 and extend upwardly therefrom and around a pair of large diameter pulleys 50 (FIG. 1b) rotatably mounted on the machine frame 38.

The pulleys 50 are rotatably mounted in a common shaft 51 and are spaced apart axially of the shaft 51, and a curved guide plate 53 extends around the axis of the shaft 51 between the pulleys 50 and at a spacing from the shaft 51.

Beyond the pulleys 50, there is provided a nesting mechanism indicated generally by reference numeral 55 for stacking the cups 11 in nested relationship.

The nesting mechanism 55 comprises a pair of elongate guide plates 56 which are spaced apart to receive and guide the cups 11 therebetween, and an endless belt conveyor 57 having an upper run extending along and below the spacing between the guide plates 56 for receiving the cups 11 from between the pulleys 50 and for frictionally impelling the cups 11 along the spacing between the guide plates 56.

Figure 2:
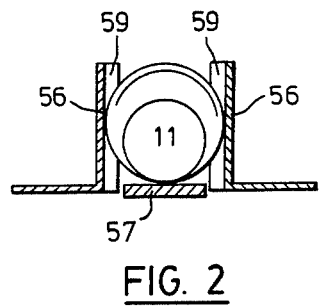
FIG. 2 shows a partial view of the apparatus of FIGS. 1a and 1b taken in cross-section along the line II—II of FIG. 1b.

The guide plates and the upper run of the endless belt conveyor 57 are downwardly inclined and, as shown in FIG. 2, the lowermost ends of the guide plates 56 are formed with inturned flanges 59 which form abutments for engaging and stopping the advance of the leading one of the cups 11.

The spacing between the pulleys 50 is adjustably variable by means of a mechanism which will now be described with reference to FIG. 4.

Figure 4:
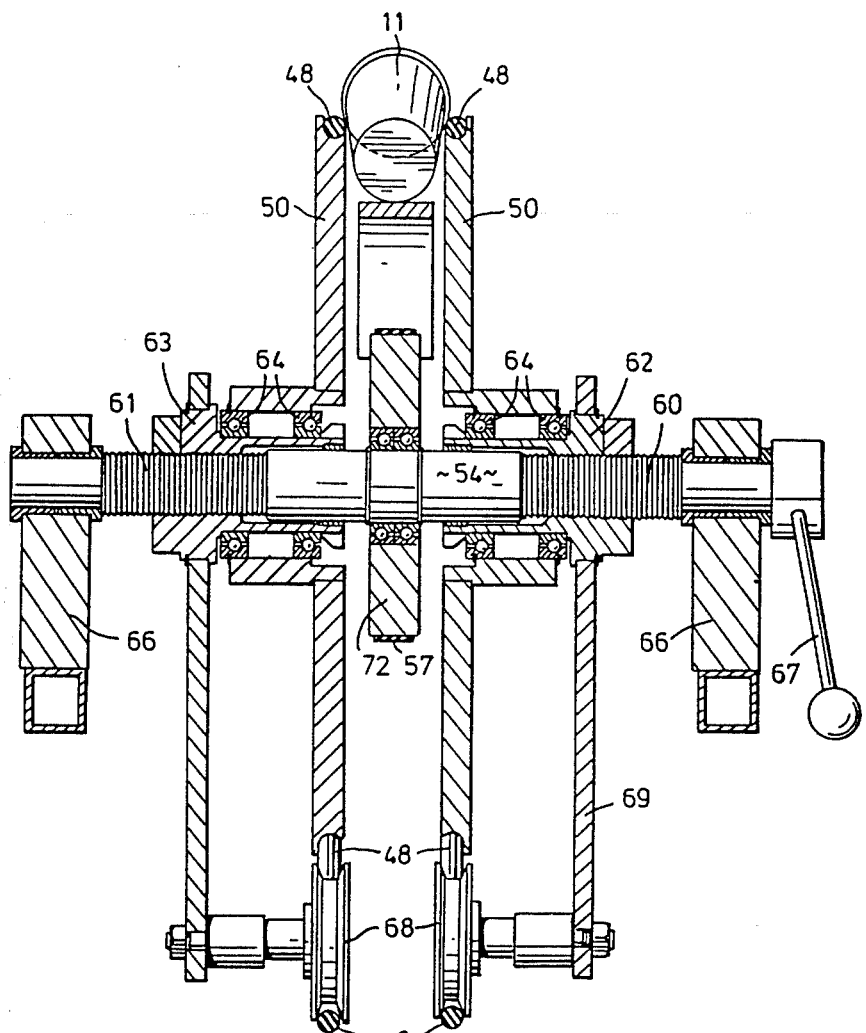
FIG. 4 shows a broken-away view taken in cross-section along the line IV—IV of FIG. 1b.

As shown in FIG. 4, the shaft 51 is formed with a right hand threaded portion 60 and a left hand threaded portion 61, which portions are in threaded engagement with respective bearing sleeves 62 and 63 supporting the pulleys 50 by means of roller bearings 64.

The shaft 54 is rotatably mounted in bearing blocks 66 and is provided with a lever 67 for rotating the shaft 54 relative to the bearing blocks 66.

As will be readily apparent, such rotation of the shaft 54, through the opposite threads 60 and 61, causes the pulleys 50 to be displaced towards or away from one another, depending on the direction of rotation of the lever 67. Idler rollers 68, which are freely rotatably mounted on side plates 69 secured to the bearing sleeves 62 and 63, are adjustable along slots 70 (FIG. 1b) in the side plates 69 for adjusting the tension in the endless belts 48.

The endless belt 57 extends around a pulley 72, which is freely rotatably mounted on the shaft 54, and around a further pulley 73, which is driven by an electric motor 74. The electric motor 74 drives only the endless belt 57, the remaining endless belts of the apparatus being driven by a main electric drive motor 75.

Through an endless belt 76 and pulleys 77 and 78, the drive motor 75 drives a speed reduction gearing 79.

The speed reduction gearing 79 has an output pulley 80 which drives pulleys 81 and 82 through an endless belt 83.

The pulley 81, through a pulley 84, drives one of the endless belts 34, which extends around the pulley 84 and a pulley 85, while the pulley 82, through a pulley 86, drives the other endless belt 34, which extends around the pulley 86 and a further pulley 87.

The speed reduction gearing 27 is driven from the pulley 85.

The speed reduction gearing 79 also drives the upwardly inclined endless belts 48 through an endless belt 90, pulleys 91 and 92 and the pulleys 49, the pulleys 92 and 49 being mounted on a common shaft 93 and the shaft 93 being of square cross-section and engaging in correspondingly square holes in the pulleys 49, whereby the spacing of pulleys 49 can be adjusted in accordance with the spacing of the pulleys 50.

Figure 5:
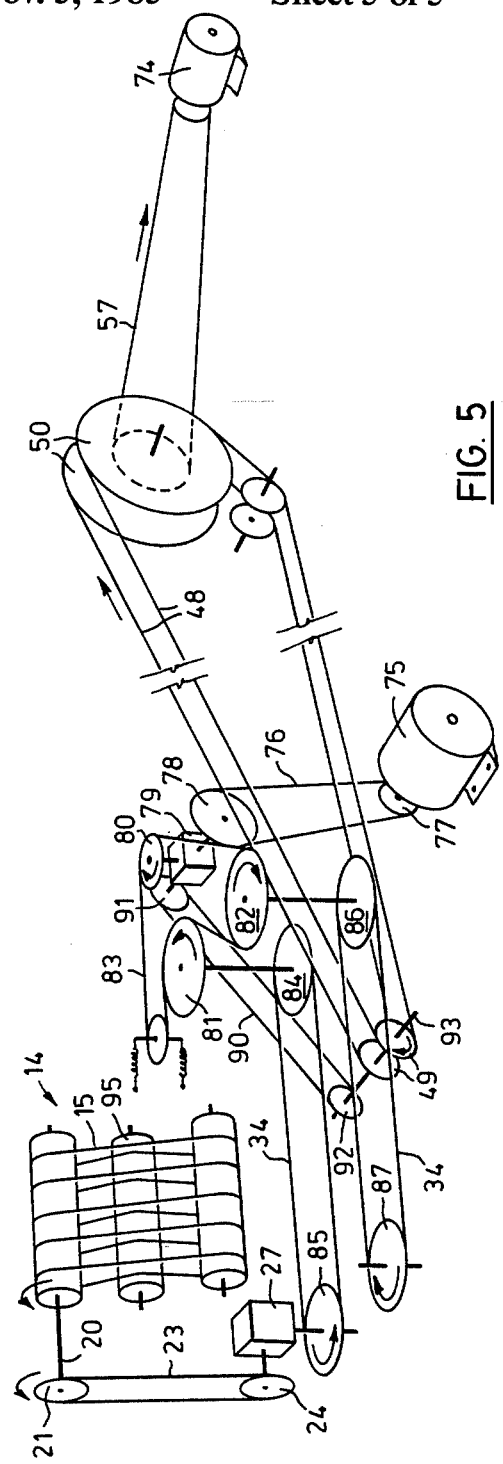
FIG. 5 shows a diagrammatic view, in cross-section, of the drive transmission of the apparatus shown in the FIGS. 1a and 1b.

As shown in FIG. 5, the endless belts 15 of the downwardly inclined ramp 14 are tensioned by means of a tensioning roll 95, which is adjustable relative to the side plates 27 and 28 by means of an adjustment bolt 96 (FIG. 3). The tensioning roll 95 is formed with grooves or recesses, one of which is indicated by reference numeral 97 in FIG. 3, for receiving and laterally guiding the endless belts 15.

The pulleys 84 and 85 are mounted for movement with the slide block 36, and the pulleys 86 and 87 are mounted for movement with a slide plate 100, to which the deflector plate is secured, so that the positions of the endless belts 34 are adjusted correspondingly as the respective verticals 30 and 32 are adjusted towards and away from the gap 31.

The operation of the above-described apparatus is as follows:

As the cups 11 are discharged in random orientations from the lower end of the conveyor 10, they drop onto the downwardly inclined ramp formed by the upper runs of the endless belts 15.

The cups 11 then tumble down the downwardly inclined ramp 14 towards the gap 31, where they are deflected by the vertical wall 30.

The majority of the cups 11 then immediately fall through the gap 31 and downwardly between the vertical walls 30 and 32 until they are suspended between the conveyor belt runs 33 as shown in FIG. 3.

However, some of the cups 11 travelling down the downwardly inclined ramp 14 will tumble so that they bridge the gap 31 between the endless belts 15 and the vertical plate 30. The portions of these cups which are adjacent the rest on the endless belts 15 will be displaced upwardly along the ramp 14, since the belts 15 are driven so that the upper runs or courses thereof travel upwardly along the inclined ramp 14. Consequently, these cups 11 will be rotated until they cease to bridge the gap 31 and can drop through the gap 31.

The cups 11, suspended between the endless belts 34, are advanced thereby towards the upwardly inclined endless belts 48, which receive and raise the cups 11 from the endless belts 34.

The endless belts 48 are driven at a speed which is greater than that at which the endless belts 34 are driven, so that the cups 11 are spaced apart along the endless belts 48 by a distance which is sufficient to enable the cups to be tilted, as described hereinafter, without interfering with one another.

As the cups 11 are carried upwardly by the upwardly inclined endless belts 48, the lowermost ends thereof eventually are brought into contact with the curved guide member 53 between the pulleys 50.

The guide member 53 is curved so that, in the direction of rotation of the pulleys 50 around the axis of the shaft 51, the spacing between the axis of the shaft 51 and the guide member 53 increases.

Figure 1B:
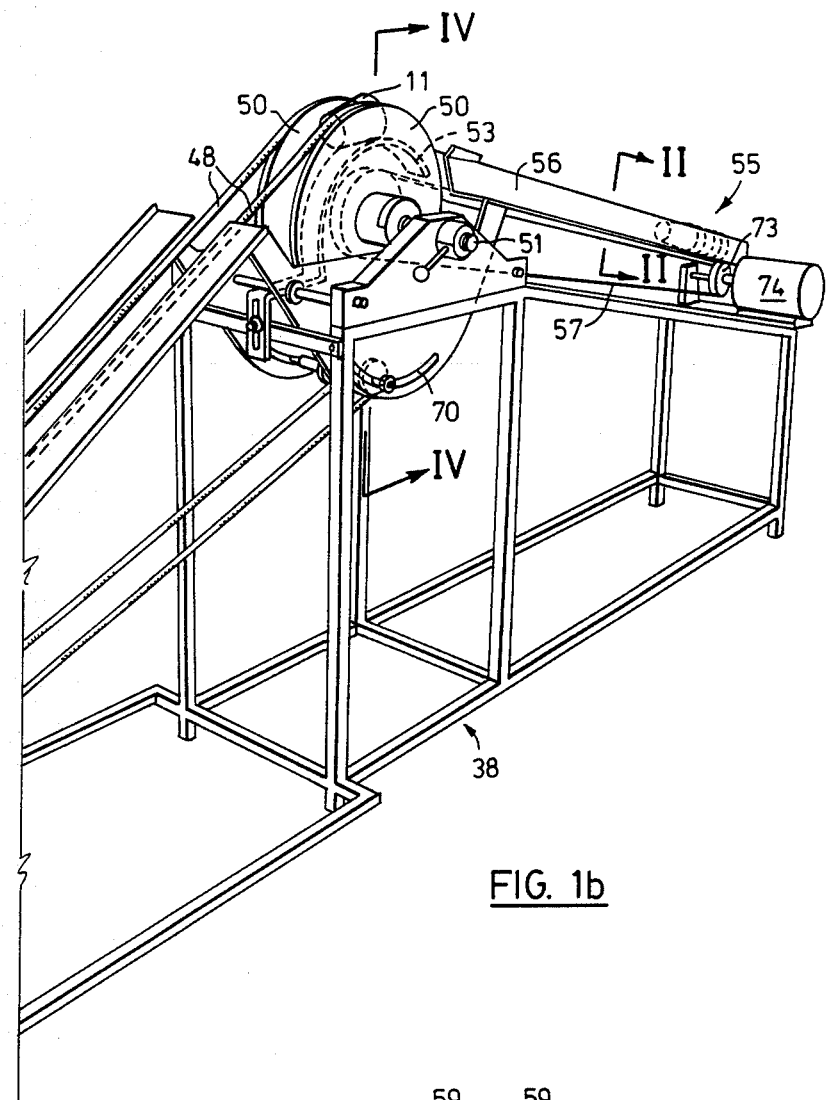

Consequently, as the cups 11 are carried around and between the pulleys 50, they are firstly tilted from their upright positions, in which they are shown in FIG. 1a, to a tilted position, in which one of the cups 11 is shown in FIG. 1b, and are then pressed outwardly from between the endless belts 48 and dropped onto the upper run of the endless belt 57, between the elongate members 56, in the position illustrated in FIG. 2.

The cups 11 are then impelled along the spacing between the guide plates 56 by the frictional engagement of the endless drive belt 57 with the cups. The leading cup 11 is in this way moved into abutment with the flanges 59, which arrest the advance of this cup, and the following cups are then each advanced into nesting engagement with the preceding cup.

As will be apparent to those skilled in the art, various modifications may be made within the scope of the present invention to the above-described embodiment thereof. For example, the plurality of endless belts 15 may be replaced by a single-wide belt, with suitable means for laterally guiding such belt.

Alternatively, the endless belts 15 may be replaced by a stationary, downwardly inclined ramp surface, a roller being provided at the lowermost end of the ramp surface, with the upper portion of the periphery of such roller in at least approximate alignment with the ramp surface and with the roller being rotated in the same direction as the roll 18 shown in FIG. 3 in order to dislodge, in the above-described manner, any of the cups 11 which bridge the gap 31.

I claim:

1. Apparatus for orienting frusto-conical articles having opposite ends of different width, comprising:
    downwardly inclined ramp means for receiving said articles in random orientations and allowing said articles to fall along said downwardly inclined ramp means;
    means extending transversely of the ramp means and spaced by a gap from the lower end of said ramp means and constituting an abutment for said articles;
    said gap being greater than the width of the widest end of said articles and less than the length of said articles;
    conveyor means beneath said gap for receiving and conveying said articles;
    said conveyor means comprising a pair of conveyor belts extending parallel to said gap and spaced apart by a distance which is greater than the width of the narrowest end of said articles and less than the length of said articles and means for driving said conveyor belts;
    said downwardly inclined ramp means having means for displacing upwardly of said ramp means an adjacent portion of any of said articles which bridges said gap, whereby said articles are caused to fall between said conveyor belts with said widest ends thereof uppermost.

2. Apparatus as claimed in claim 1, wherein said conveyor belts are of circular cross-section.

3. Apparatus as claimed in claim 1, wherein said displacing means comprises endless belt means having an inclined upper course for forming said downwardly inclined ramp means, and means for driving said endless belt means so that said upper course moves upwardly along said downwardly inclined ramp means.

4. Apparatus as claimed in claim 3, wherein said endless belt means comprise a plurality of laterally spaced endless belts and means for laterally guiding said endless belts.

5. Apparatus as claimed in claim 1 further including means for adjusting the spacing of said conveyor belts from one another.

6. Apparatus as claimed in claim 1, wherein said conveyor belts extend at least substantially horizontally and a pair of upwardly inclined conveyor belts are provided for receiving and raising said articles from said horizontal conveyor belts, means being provided for driving said upwardly inclined conveyor belts at a faster speed than said horizontal conveyor belt.

7. Apparatus as claimed in claim 6, further comprising means for nesting said articles, said nesting means comprising a pair of elongate guide members spaced apart for laterally guiding said articles therebetween, means for frictionally driving said articles along the spacing between said elongate guide members and retainer means for limiting the travel of a leading one of said articles along said elongate guide members.

8. Apparatus as claimed in claim 7, wherein said frictional drive means comprise a conveyor belt having an upper course extending beneath the spacing between said elongate guide members longitudinally thereof and means for driving said conveyor belt.

9. Apparatus as claimed in claim 6, further comprising means for releasing said articles from said upwardly inclined conveyor belts, said releasing means comprising guide means located beneath the path of travel of said articles for tilting said articles and forcing said tilted articles from between said upwardly inclined conveyor belts as said articles are advanced by said upwardly inclined conveyor belts.

10. Apparatus as claimed in claim 9, further comprising a pair of second co-axial pulleys, said upwardly inclined conveyor belts extending around said pulleys and said guide means comprising a guide member curved around the axis of said pulleys.

11. Apparatus as claimed in claim 6 further comprising means for varying the spacing of said upwardly inclined conveyor belts.

12. Apparatus for orienting frusto-conical articles having a length greater than the greatest diameter thereof, comprising:
   endless belt means for receiving said articles in random orientation;
   said endless belt means having an inclined upper rim forming a downwardly inclined ramp for guiding said articles in a downwardly inclined direction;
   means for driving said belt means so that said upper rim travels in a direction opposite to said downwardly inclined direction;
   deflector means spaced by a gap from the bottom of said downwardly inclined rim for deflecting said articles downwardly through said gap;
   said gap having a width less than the length of said articles and greater than the largest diameter of said articles;
   a pair of endless conveyor belts spaced apart beneath said gap by a distance less than the greatest diameter of said articles for receiving and conveying said articles with said greatest diameter uppermost; and
   means for driving said conveyor belts.

13. Apparatus as claimed in claim 12, wherein said deflector means comprise a first wall extending above and below said gap at one side thereof, and a second wall extends downwardly from said downwardly inclined ramp at the opposite side of said gap.

14. Apparatus as claimed in claim 12, including means for adjustably varying said gap and the spacing between said endless belts.

* * * * *